United States Patent [19]

Lin

[11] Patent Number: 4,813,463

[45] Date of Patent: Mar. 21, 1989

[54] INSTANTLY APPLICABLE CORRECTION FLUID CONTAINER STRUCTURE

[75] Inventor: Feng-Yu Lin, San Chung, Taiwan

[73] Assignee: Huang Chen Correction Fluid Industry Co. Ltd., San Chung City, Taiwan

[21] Appl. No.: 77,680

[22] Filed: Jul. 22, 1987

[51] Int. Cl.[4] .......................... B43K 1/06; F16K 51/00

[52] U.S. Cl. .................................... 141/351; 222/518; 401/260; 141/346

[58] Field of Search ............... 222/518, 162, 449, 453; 141/351-362, 346, 348, 349, 350; 401/258-260, 264

[56] References Cited

U.S. PATENT DOCUMENTS

| | | | |
|---|---|---|---|
| 241,561 | 5/1881 | Parker | 222/518 |
| 247,488 | 9/1881 | Elliott | 222/518 |
| 689,468 | 12/1901 | Dobbyn | 141/353 |
| 748,383 | 12/1903 | Langill | 401/264 X |
| 1,827,458 | 10/1931 | Comer | 141/356 |
| 2,045,926 | 6/1936 | Reutter | 222/518 X |
| 2,337,276 | 12/1943 | Sanchis | 222/518 X |
| 2,577,687 | 12/1951 | Lee | 222/249 |
| 2,801,032 | 7/1957 | Hall | 141/360 |
| 3,016,171 | 1/1962 | Becher | 222/518 |
| 3,144,676 | 8/1964 | La Mura | 222/453 X |
| 3,832,071 | 8/1974 | Chaney | 401/260 |
| 4,210,263 | 7/1980 | Bos | 222/449 |
| 4,217,994 | 8/1980 | Koenig et al. | 222/212 |
| 4,271,982 | 6/1981 | Niksich et al. | 222/518 X |
| 4,543,005 | 9/1985 | Kuboshima | 401/260 |

FOREIGN PATENT DOCUMENTS

| | | | |
|---|---|---|---|
| 538909 | 6/1955 | Belgium | 401/260 |
| 143123 | 5/1920 | United Kingdom | 401/264 |
| 2077886 | 12/1981 | United Kingdom | 141/360 |
| 2146588 | 4/1985 | United Kingdom | 401/260 |

*Primary Examiner*—Henry J. Recla
*Assistant Examiner*—Ernest G. Cusick
*Attorney, Agent, or Firm*—Browdy and Neimark

[57] ABSTRACT

An instantly applicable correction fluid container structure is provided with a threaded cap which can semi-automatically dispense the contents via a port on the top of the cap by pressing down the upper conical portion of a spring-biased mounted control portions therein. The structure may provide the benefits in practice of convenience and prevents the drying of the contents of the container.

2 Claims, 1 Drawing Sheet

INSTANTLY APPLICABLE CORRECTION FLUID CONTAINER STRUCTURE

BACKGROUND OF THE INVENTION

1. Field of the Invention

This invention relates to an instantly applicable correction fluid container structure. More specifically, this invention is directed to a correction fluid container structure which can semi-automatically dispense the fluid contents via a port on the top of a cap provided at the head of the correction fluid container, by pressing down the upper conical portion of an spring-mounted control means, having two opposing conical portions, which is received inside the cap.

2. The Prior Art

Heretofore, the commercially available correction fluid container structure is one having a threaded cap with a brush used for dipping into the fluid contents and applying the contents onto the paper to mask an error or a stain.

However, since the correction fluid is highly volatile, while the conventional container is opened for use, the fluid contents dry up easily and hardens everywhere, i.e., on the opening of the container, inside of the cap, throughout the brush rod and the like. Consequently, the cap cannot be tightly closed and/or the fluid contents can hardly be used. In such circumstances, the hardened mass usually is dissolved by a solvent thinner or otherwise must be scraped to remove it.

Therefore, the conventional correction fluid container has the disadvantages of easily drying up and, readily exposing the contents to the air and is uneconomical because of the additional solvent thinner required. A need for an improved correction fluid container structure without the above-mentioned disadvantages is still existing.

SUMMARY OF THE INVENTION

In view of these disadvantages, an object of the present invention is to overcome the aforementioned drawbacks of the prior art.

More particularly, the object of the invention is to provide an instantly applicable correction fluid container structure which avoids these disadvantages and especially has the advantage of ease and convenience of use by means of a simple assembly of a control means with two opposing conical portions spring-mounted inside a cap of the container. The assembly is designed for easy passage of the fluid, avoiding the blockage caused by the solidified content of the fluid and eliminating the need for the constant addition of thinner.

A further object of the invention is to provide an instantly applicable correction fluid container structure having a port can be adjusted and opened through the adaptability of the spring-mounted control means resulting in an effective and uniform application of the correction fluid.

BRIEF DESCRIPTION OF THE DRAWINGS

Hereinafter, the invention both as to its construction and its method of operation, together with additional objects, advantages and benefits of usage thereof, will be best understood from the following description of specific embodiments when read in connection with the accompanying drawings, in which.

DETAILED DESCRIPTION OF THE PREFERRED EMBODIMENT

Figure 4:
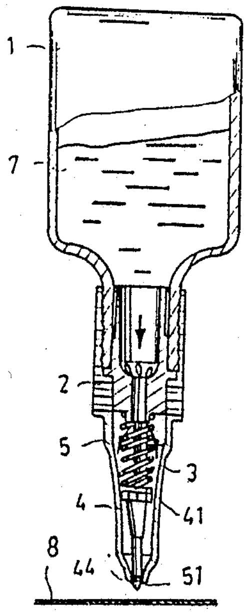
FIG. 4 is an illustration diagram for applying the structure of the present invention (dispensing stopped)
Figure 2:
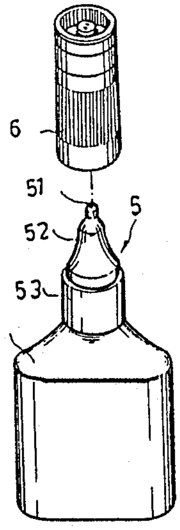
FIG. 2 is an assembled diagram of the structure of the invention with the upper cover lifted.
Figure 1:
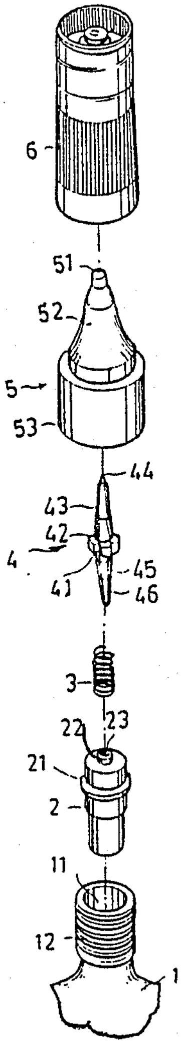
FIG. 1 is a exploded diagram of the instantly applicable correction fluid container structure of the present invention.

With reference to the specific embodiment shown in FIG. 1 and FIG. 4, the instantly applicable correction fluid container structure of the present invention comprises a container 2 having a cork means 3 on its head which is inserted into the mouth 21 of the container and stopped by a flange portion 31 in the middle thereof. A through-hole 32 penetrates through the center of the cork means 3. A stub 321 on the top of the through hole provides a base for a spring 4 associated with a control means 5 having two conical portions 51 and 52 and located in place by a flange 53. Upper and lower conical portions 51 and 52 are formed in a step-like manner as shown most clearly in FIG. 4. The portion 511 of conical portion 51 furthest from flange 53 is of narrower cross-section that the other portion 512 of conical portion 51. Several recesses 531 are distributed around the periphery of flange 53 to provide a path for the fluid flow. A cap 6 accommodates all the above-identified members with a port 611 on the tip of a conical shaped portion 61 designed according to the upper conical portion of the control means 5 in such a manner that while the control means 5 is biased by the spring 4 the upper conical portion 51 will obstruct the port 611 and an end of the conical portion 51 is externally exposed. A thread 6A is provided inside of the cap 6 in locking engagement with the thread 2A outside of the mouth 21 of the container 2 to prevent the fluid content from leakage (shown in FIG. 2). An outer cover 7 housing the cap 6 hinders the setting or hardening of the correction fluid at the port 61.

Accordingly, while not being pressed, the end of the upper conical portion 51 of the control means 5 will always obstruct the port 611 by the biasing force of the spring 4. However the lower conical portion 52 thereof leaves the through-hole 32 when the container is turned upside-down and an aliquot of the correction fluid L (indicated by an arrow) flows into the cap ready for use, though not introduced out yet (shown in FIG. 4).

Figure 5:
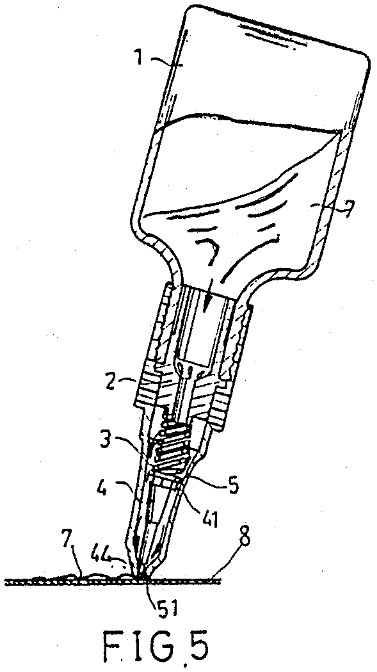
FIG. 5 is an illustration diagram for applying the structure of the present invention (upon dispensing).
Figure 3:
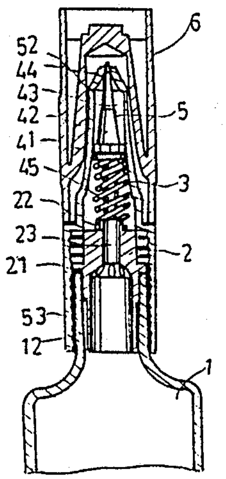
FIG. 3 is an assembled diagram of the structure of the present invention.

As shown in FIG. 5, when the end of the upper conical portion 51 of the control means 5 is depressed, that is the container 2 is reversed and pressed down onto the paper P, the lower conical portion 52 will move backwardly and stop the passage of the contents fluid L from passing out through through-hole 32. Meanwhile the correction fluid L1 ready for use previously introduced into the cap 6 will diffuse through the gap formed between the port 611 and the upper conical portion 51 by the depression and consequent withdrawal of the upper conical portion 51. Furthermore, upon raising the container from the paper P, the control means 5 will be pushed back to the position as shown in FIG. 4 and block the outlet of the contents.

In view of the above, the construction of the invention can supply the correction fluid as one wishes to mask the error and stain on the paper. The fluid contents will not leak out in excess and its solidification is hampered. Thus, the advantages of the construction of the invention are established.

Although this invention has been shown and described with respect to a preferred embodiment, it will be understood by those skilled in the art that various changes in form and detail thereof may be made without departing from the spirit and scope of the invention claimed as follows.

What is claimed:

1. An instantly applicable correction fluid container structure comprising:

a container provided with a raised head part having outward threads;

cork means disposed in the head part of the container for blocking passage of fluids from the container, said cork means comprising a first flange in a substantially middle portion thereof for locating said cork means in the head part, a through-hole penetrating through a substantially central portion of said cork means, and a stub on a top portion of said cork means;

a spring placed on the stub so as to extend upwardly from said cork means;

control means disposed in operative relationship with said cork means for controlling selective passage of fluids from the container, said control means comprising a second flange in a substantially middle portion thereof, an upper conical portion extending from a first surface of said second flange and a lower conical portion extending from a second surface of said second flange opposite from said first surface and disposed within and biased by said spring, said second flange comprising several recesses for allowing passage of the fluids, said upper and lower conical portions being formed in a step-like manner having a first and a second portion, said first portion closest to said second flange having a larger cross-section than said second portion;

a first cap comprising a conical shaped upper portion having a port of sufficient size for a tip of the second portion of the upper conical portion to be exposed therethrough and a cylindrical lower portion having threads on an inner surface thereof adapted to be in locking engagement with the threads of the head part of the container to cover said control means, said spring and said cork means, wherein when said upper conical portion is not pressed, said upper conical portion of said control means obstructs said port by the biasing action of said spring against said second flange, when the container is turned upside-down, an aliquot of fluid is introduced into said cap, and when the tip of said upper conical portion is pressed against a surface, said control means moves against the biasing action of said spring so as to open said port and cause the aliquot to exit from said cap.

2. The structure according to claim 1, further comprising a cylindrical cap adapted to be inserted over said first cap for preventing drying of the fluid in the container.

* * * * *